No. 848,493. PATENTED MAR. 26, 1907.
A. REDENBAUGH.
PIPE STOPPER OR TEST PLUG.
APPLICATION FILED MAR. 29, 1906.

2 SHEETS—SHEET 1.

WITNESSES
E. Thorpe.
Isaac B. Owens.

INVENTOR
Adam Redenbaugh
BY Munn & Co.
ATTORNEYS

No. 848,493. PATENTED MAR. 26, 1907.
A. REDENBAUGH.
PIPE STOPPER OR TEST PLUG.
APPLICATION FILED MAR. 29, 1906.

2 SHEETS—SHEET 2.

WITNESSES
Edward Thorpe.
Isaac B. Owens.

INVENTOR
Adam Redenbaugh
BY Munn & Co
ATTORNEYS

UNITED STATES PATENT OFFICE.

ADAM REDENBAUGH, OF PITTSBURG, PENNSYLVANIA.

PIPE-STOPPER OR TEST-PLUG.

No. 848,493.  Specification of Letters Patent.  Patented March 26, 1907.

Application filed March 29, 1906. Serial No. 308,698.

*To all whom it may concern:*

Be it known that I, ADAM REDENBAUGH, a citizen of the United States, and a resident of Pittsburg, in the county of Allegheny and State of Pennsylvania, have invented a new and Improved Pipe-Stopper or Test-Plug, of which the following is a full, clear, and exact description.

The invention relates to a device for temporarily stopping or closing pipes, particularly soil-pipes, to permit testing the same; and it resides in certain special features of construction insuring an absolutely tight closure and at the same time entirely facilitating the operation, all of which will be fully set forth hereinafter, and particularly pointed out in the claims.

Reference is to be had to the accompanying drawings, which illustrate as an example the preferred embodiment of my invention, in which drawings—

Figure 1:
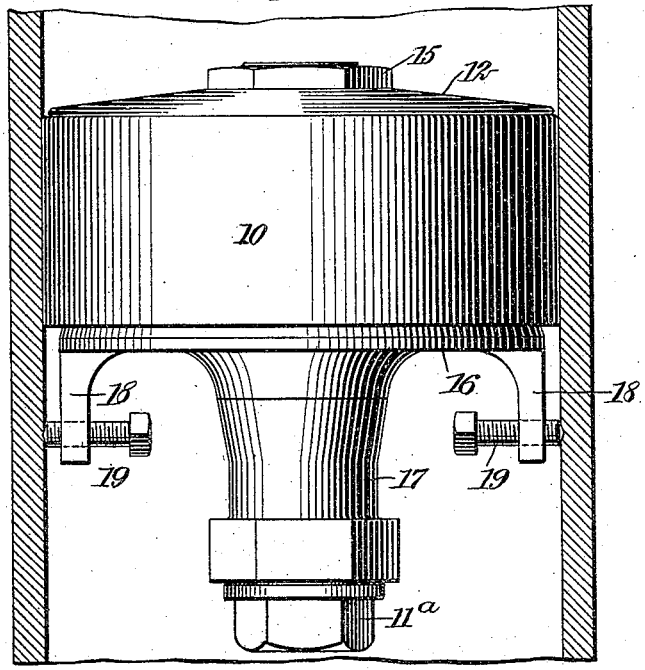
Figure 2:
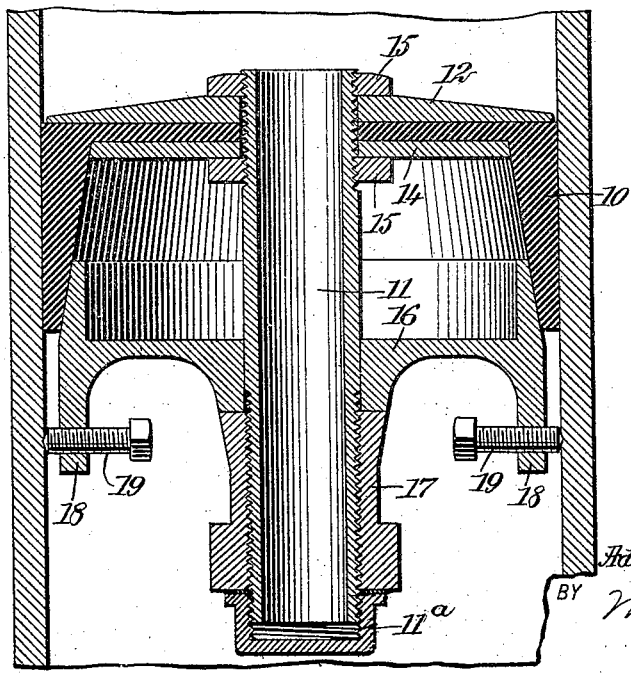
Figure 3:
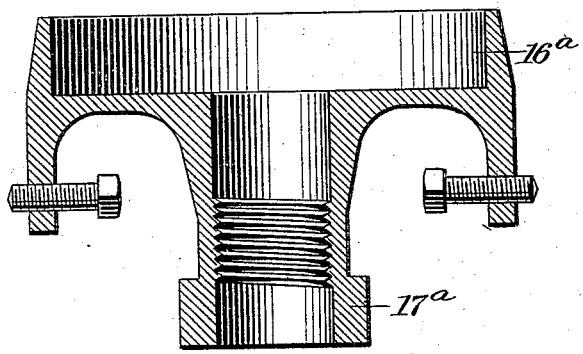
Figure 4:
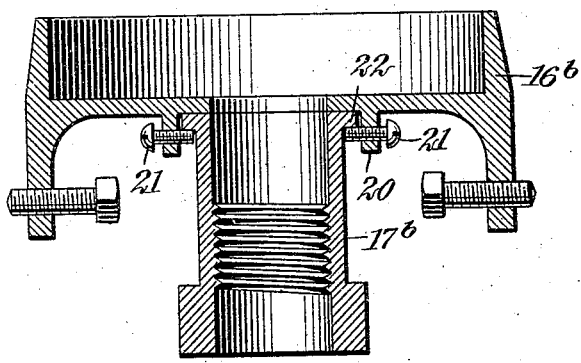

Figure 1 is a view showing the pipe in section and illustrating the plug or stopper in position. Fig. 2 is a sectional view of the plug or stopper. Fig. 3 is a view showing a modification in which the expander and its actuating-nut are formed integral, and Fig. 4 is a sectional view of a modification in which a peculiar rotatable connection is effected between these two parts.

Referring first to Figs. 1 and 2, 10 indicates a rubber or other flexible or elastic cup through which the stem 11 of the plug passes. 12 and 14 indicate clamp-plates lying at opposite sides of the bottom of the cup 10 and having the stem 11 passed through them, the clamp-plates being secured firmly against the cup by means of jam-nuts 15, operating on the stem. The cup 10 is arranged to fit into the pipe with its circular side walls in engagement with the inner walls of the same. The inner side walls of the cup are slightly tapered, as shown, and coacting therewith is a correspondingly-tapered expander 16. Said expander is loosely mounted on the stem 11, and by forcing it inward into the cup the side walls of the cup are expanded firmly against the walls of the pipe, thus effecting a hermetic connection. The expander, according to the construction shown in Figs. 1 and 2, is driven home by means of an elongated operating-nut 17, which is threaded on the stem 11 and upon the operation of which the expander may be forced into the rubber or other cup 10. Said expander is provided with lugs 18, and in these lugs set-screws 19 operate, so that after the expander has been moved into proper position by means of the nut 17 it may be locked rigidly with the pipe through the medium of the set-screws. 11$^a$ indicates a plug for closing the tubular stem 11. This device, it may be observed, may be quickly applied to and removed from the pipe, and by proper operation of the expander the cup may be caused to engage the walls of the pipe so firmly as not only to insure a hermetic connection, but also to avoid the possibility of the plug or stopper being thrown out of the pipe by the pressure therein.

If desired, the expander 16$^a$ and its operating-nut 17$^a$ may be formed integral, as shown in Fig. 3, in which case the expander will turn in the cup during the operation of forcing the former into place. If desired, the expander 16$^b$ (see Fig. 4) may be formed with an annular flange 20, carrying set-screws 21, these set-screws engaging a flange 22 on the operating-nut 17$^b$, thus effecting between the parts a rotatable connection, but preventing them from being separated from each other.

Various other changes may be made in the device without departing from my invention, and the plug may, of course, be made to take any desired or effective position in the pipe.

Having thus described the preferred form of my invention, what I actually claim, and desire to secure by Letters Patent, is—

1. A pipe-stopper comprising an elastic cup having its inner side walls tapering, and having a central opening in the bottom, a stem threaded at each end passing through the opening of the cup, jam-nuts on the stem on each side of the cup, and engaging the bottom whereby to retain the cup in position upon the stem, an expander slidable on the stem and tapered to correspond with the side walls of the cup, an operating-nut threaded on the stem for forcing the expander into the cup, lugs on the expander, and set-screws traversing the lugs at right angles to the stem and adapted to engage the walls of the pipe whereby to retain the stopper in place.

2. A pipe-stopper comprising an elastic cup having its inner side walls tapering, and having a central opening in the bottom, a stem threaded at each end passing through the opening of the cup, jam-nuts on the stem on each side of the cup, and engaging the bottom whereby to retain the cup in position upon the stem, an expander slidable on the stem and tapered to correspond with the side walls of the cup, means in connection with said stem and expander whereby to operate the same, lugs on the expander, and set-screws traversing the lugs at right angles to the stem and adapted to engage the walls of the pipe whereby to retain the stopper in place.

In testimony whereof I have signed my name to this specification in the presence of two subscribing witnesses.

ADAM REDENBAUGH.

Witnesses:
EDW. A. HESS,
A. H. MANSFIELD.